United States Patent [19]
Shupert

[11] Patent Number: 5,529,165
[45] Date of Patent: Jun. 25, 1996

[54] CAROUSEL STORAGE CONVEYOR

[75] Inventor: Paul T. Shupert, Parkton, Md.

[73] Assignee: St. Onge Company, York, Pa.

[21] Appl. No.: 508,158

[22] Filed: Jul. 27, 1995

[51] Int. Cl.⁶ .................................................. B65G 1/00
[52] U.S. Cl. ................................................... 198/347.3
[58] Field of Search ............................. 198/347.2, 347.3

[56]           References Cited

U.S. PATENT DOCUMENTS

| | | |
|---|---|---|
| 940,793 | 11/1909 | Emerick . |
| 1,102,493 | 7/1914 | Gianini . |
| 3,762,582 | 10/1973 | Barnhart et al. ................. 198/347.3 X |
| 3,770,146 | 11/1973 | Sundin . |
| 3,788,054 | 1/1974 | Haussmann et al. ............ 198/347.3 X |
| 4,273,234 | 6/1981 | Bourgeois .............................. 198/347.3 |
| 4,499,987 | 2/1985 | Long . |
| 4,560,057 | 12/1985 | Applegate et al. .............. 198/347.3 X |
| 5,038,909 | 8/1991 | Covert ................................... 198/347.3 |
| 5,255,773 | 10/1993 | Pollock . |

*Primary Examiner*—James R. Bidwell
*Attorney, Agent, or Firm*—Flynn, Thiel, Boutell & Tanis

[57]           ABSTRACT

A carousel storage conveyor for articles being conveyed along a conveyor unit having rows of shelf units which are spaced apart about a closed loop path and which move through the complete loop to pick up or discharge articles when at the lowermost point in the loop and to store the articles as the shelf units move away from the conveyor unit. The shelf units include spaced apart hangers and the conveyor unit includes recesses which cooperate with the respective hangers and permit the conveyor unit to be moved upwardly for passage of the articles through the hangers or downwardly so that said articles are supported thereby.

20 Claims, 8 Drawing Sheets

CAROUSEL STORAGE CONVEYOR

FIELD OF THE INVENTION

The invention relates to a carousel storage conveyor for storage of articles being transported on a conveyor and, more particularly, to a carousel storage conveyor having rows of shelf units which travel about a loop, which shelf units are closed on both sides and transfer various size articles to and from the conveyor through the open ends thereof.

BACKGROUND OF THE INVENTION

In manufacturing, distribution and other similar industries, it is necessary to provide material handling apparatus for conveying articles, such as individual goods or cases of goods from one location to another. In particular, one operation typically is performed on the articles at one location and the articles are then conveyed to a second location where another operation is performed. Conveyor belts, roller conveyors or other similar apparatus serve to transport the articles.

In transporting the articles from the first location to the second location, a delay at the second location may occur which would require that the supply of articles to the second location be stopped, at least temporarily. So as not to stop the operation being performed at the first location, a storage conveyor may be provided intermediate the first and second locations to receive and store articles until the stoppage downstream has ended. Thereafter, the articles may be discharged to the second location.

One example of a storage conveyor is disclosed in U.S. Pat. No. 4 499 987. The storage conveyor or accumulator disclosed therein includes a conveyor section having rollers which transport the articles therealong and a vertical lifting carousel offset to one side thereof which has fingers which move upwardly between the individual rollers so as to lift and store the articles. The fingers are cantilevered and the roller conveyor must therefore be open on one side to accommodate passage of these fingers between the rollers.

Similarly, U.S. Pat. No. 5 255 773 discloses a carousel conveyor system wherein cantilevered fingers also are used and which pass between the rollers of an associated roller conveyor. Here again, the roller conveyor must accommodate passage of the fingers between the rollers and the articles are not maintained in an upright position at all times when stored in said carousel conveyor.

It is desirable therefore to provide a carousel storage conveyor which accommodates articles with a wide variety of shapes and sizes while maintaining the articles in an upright orientation at all times during the storage thereof. It is also desirable that the articles be stored in shelf units in the carousel conveyor which have side members on both sides thereof to prevent dislodgement of the articles supported therein. It is further desirable that the shelf units incorporate a predetermined number of hangers spaced apart along the length of the carousel conveyor which hangers cooperate to define a shelf unit and are light in weight, relatively inexpensive and of simple construction.

SUMMARY OF THE INVENTION

This invention, in a preferred embodiment, relates to a carousel storage conveyor which facilitates removal, storage and the retrieval of articles being conveyed along a conveyor unit. The carousel storage conveyor includes a plurality of rows of shelf units which are spaced apart about a closed loop path and can move through the complete loop to pick up or discharge articles from the conveyor unit when the shelf units are at the lowermost point in the path. The shelf units pick up and store the articles within the shelf unit as they move through the closed loop path upwardly away from the conveyor unit.

Preferably, the shelf units include a plurality of spaced apart hangers that define two opposing side surfaces which prevent dislodgement of articles therefrom, a bottom article support surface and two opposite open ends which receive the articles therein when the shelf unit, i.e. the hangers are at their lowermost point of travel.

To facilitate the passage of the articles through the hangers when in the lowermost point of travel as well as the transferring of the articles from or to the conveyor unit, the conveyor unit preferably includes recesses or clearance spaces in the conveyor surface which cooperate with the respective hangers. In a preferred embodiment, the conveyor unit is moveable vertically to position the conveying surface upwardly above the article support surface for passage of the articles through the hangers or to position the conveyor surface downwardly below the article support surface so that said articles are supported in said shelf unit.

Certain terminology will be used in the following description for convenience in reference only, and will not be limiting. For example, the words "upwardly", "downwardly", "rightwardly" and "leftwardly" will refer to directions in the drawings to which reference is made. The word "forward" will be used to designate the direction of movement of the articles or conveyor components as the articles are being transported from one location to another. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Figure 1:
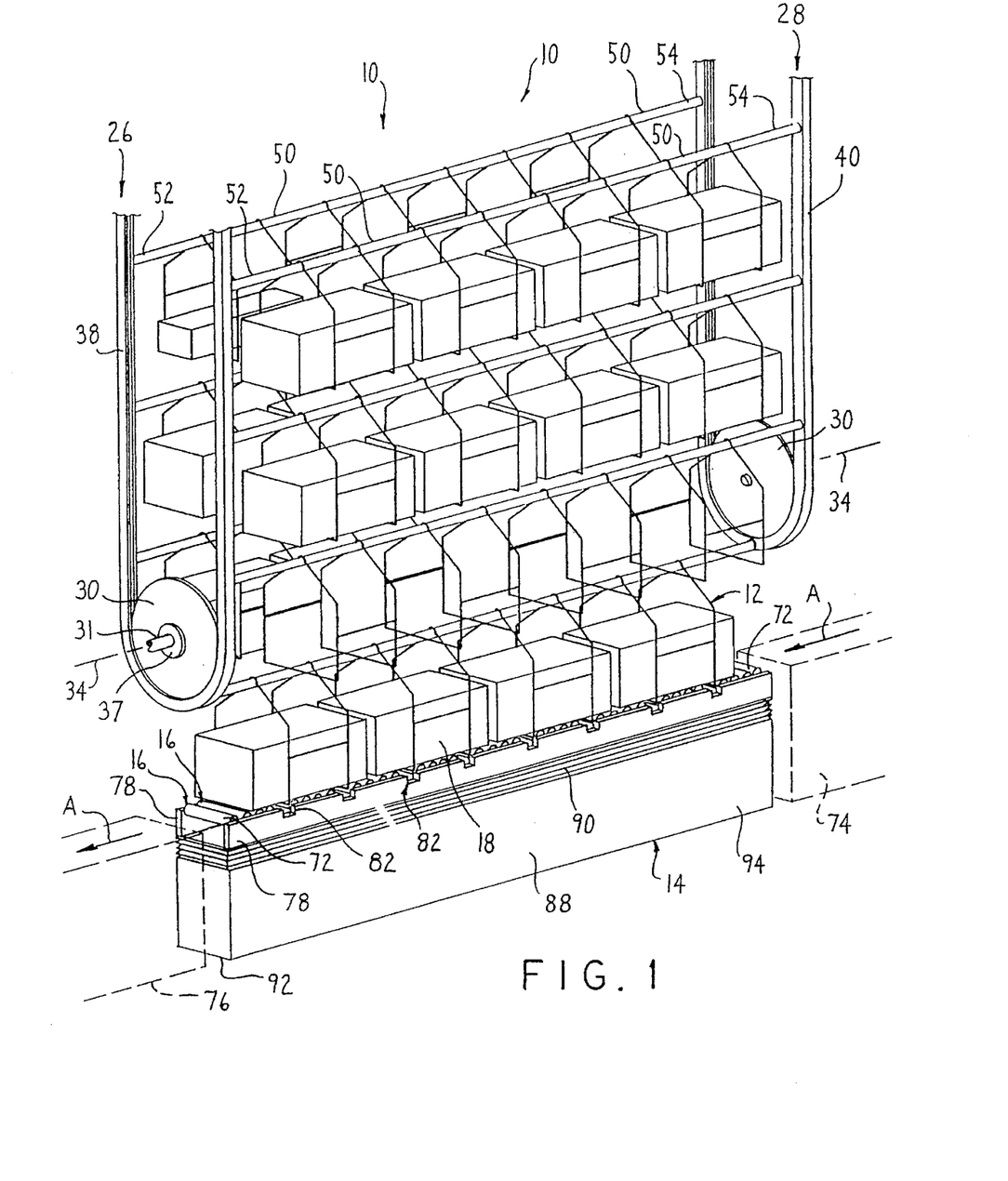
FIG. 1 is a partial pictorial view of the carousel storage conveyor according to the invention illustrated with the support frame thereof removed for purposes of clarity.
Figure 6:
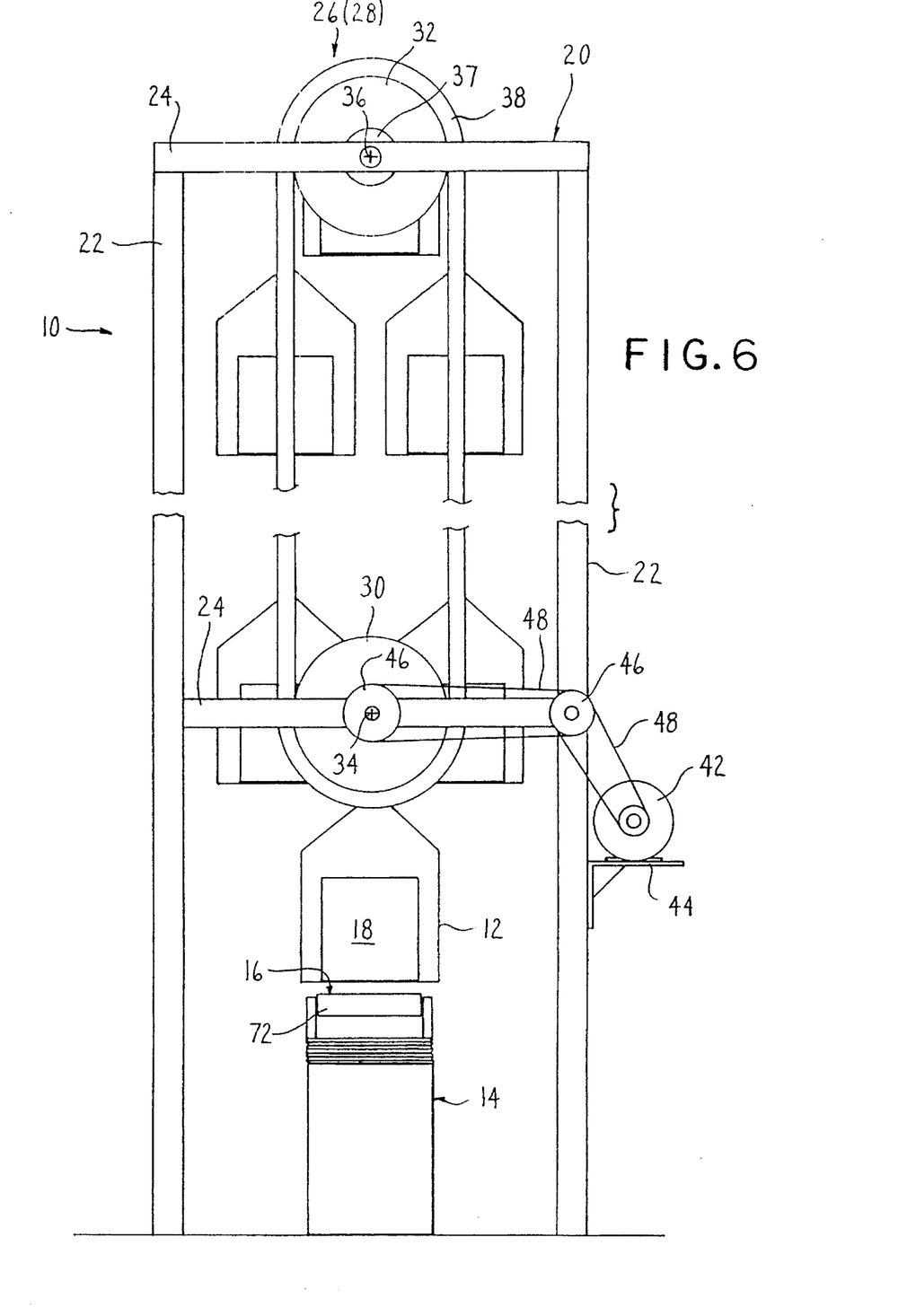
FIG. 6 is a broken partial side elevational view of the carousel storage conveyor illustrating a support frame and drive means therefor.

Referring to FIGS. 1 and 6, the carousel storage conveyor 10 of the invention includes a plurality of rows of shelf units 12, which travel about a closed upright loop path, and a conveyor unit 14, which defines a conveyor surface 16 for the transport of articles 18, such as containers or cases, along a conveying path designated by reference arrows A in FIG. 1.

Referring to FIG. 6, the carousel storage conveyor 10 includes a support frame 20, each end of which includes upright posts 22 which are disposed on opposite sides of the conveyor unit 14 and are connected one with the other by transverse cross members 24. Although the upright posts 22 and transverse cross members 24 are only illustrated in FIG. 6 on one end of the carousel storage conveyor 10, a mirror image structure also is provided on the opposite end of the carousel storage conveyor 10. The skilled artisan will appreciate that the particular construction of the support frame 20 may be varied. For clarity, FIGS. 1–5 and 7–10 illustrate the carousel storage conveyor 10 with the support frame 20 removed.

Figures 2, 3:
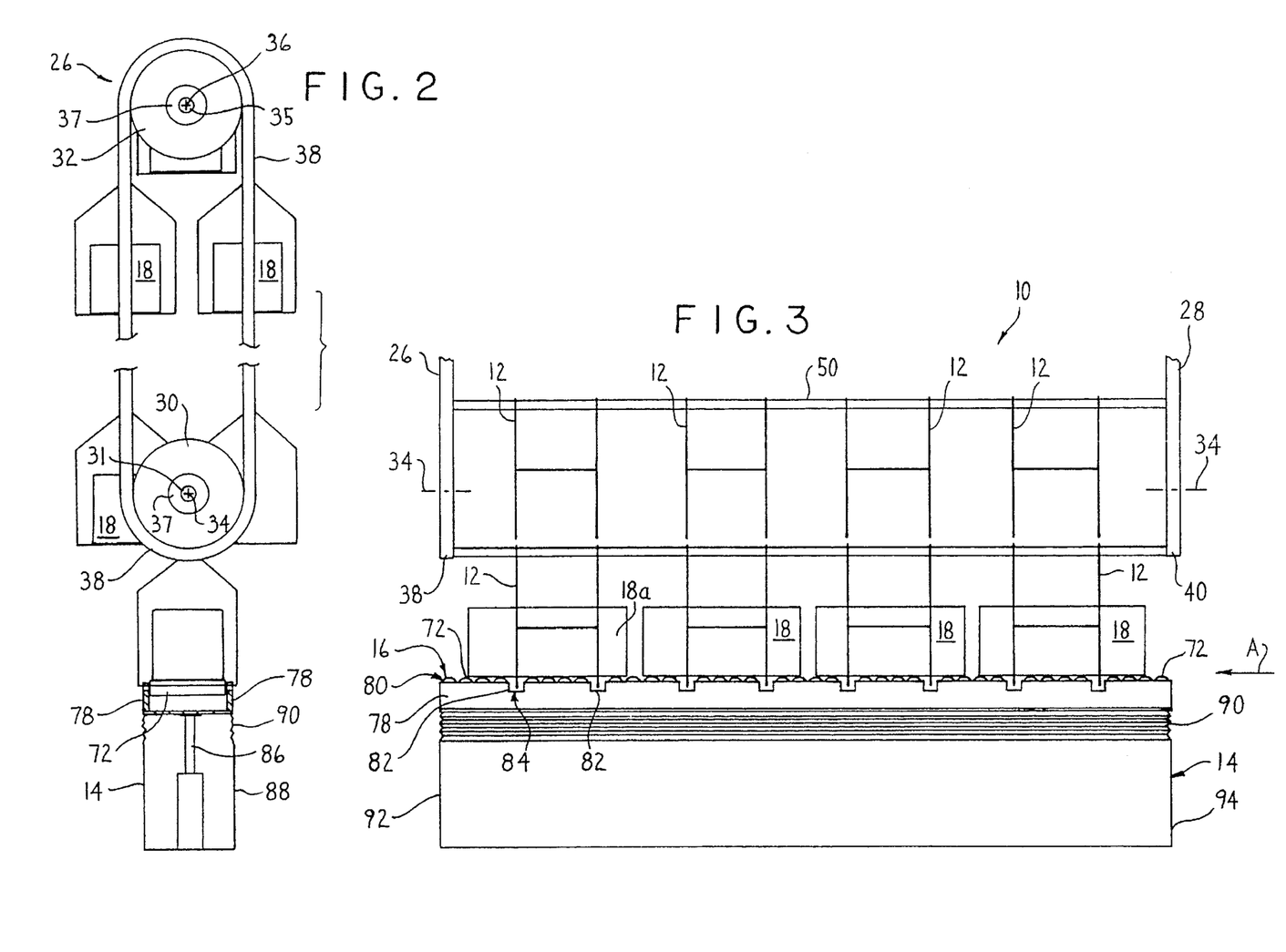
FIG. 2 is a broken side elevational view in cross section of the carousel storage conveyor shown in FIG. 1.
FIG. 3 is a partial front elevational view of the carousel storage conveyor illustrated in FIG. 2.

The carousel storage conveyor 10 also includes two drive assemblies 26 and 28 which are spaced apart one from the other along the conveying path A as illustrated in FIGS. 1–3. Referring to FIGS. 1 and 6, each of the drive assemblies 26 and 28 include a pair of lower and upper drive pulleys or sprockets 30 and 32 which are rotatably supported on the respective transverse cross members 24 of the support frame 20 (not illustrated in FIG. 1).

The lower pulleys 30 on the drive assemblies 26 and 28 are each disposed a vertical distance above the conveyor surface 16. Each lower pulley 30 has a shaft 31, which projects therefrom and is journalled to the transverse cross member 24, and rotates about a first common rotation axis 34. The upper pulleys 32 of the drive assemblies 26 and 28 are disposed a vertical distance above the lower pulleys 30 and similarly have a shaft 35 which projects therefrom and is journalled to the transverse cross member 24 so as to rotate about a second common rotation axis 36 extending therebetween. A spacer 37 is also provided to reduce frictional forces during rotation. The skilled artisan will appreciate that the lower and upper pulleys 30 and 32 may be spaced apart at any distance depending upon the height requirements of the carousel storage conveyor 10.

The drive assemblies 26 and 28 also include endless belts or chains 38 and 40 which are operatively engaged with and are driven by rotation of the corresponding lower and upper pulleys 30 and 32. To move the endless belts 38 and 40, the pulleys 30 and 32 and belts 38 and 40 are operatively engaged one with the other by any suitable means such as by forming the belts 38 and 40 and the pulleys 30 and 32 so as to provide a toothed or friction fit arrangement or by a sprocket and chain arrangement.

To selectively rotate the pulleys 30 and 32 and drive the respective belts 38 and 40, a reversible drive motor 42 or other suitable drive means is provided that is mounted on a support bracket 44 which is secured to one of the upright posts 22 as illustrated in FIG. 6. To drive the lower sprocket 30 upon operation of the drive motor 42, a system of sprockets or pulleys 46 and drive chains or belts 48 may be provided. Preferably, a similar drive arrangement should be mounted to the support frame 20 on the opposite end of the carousel storage conveyor 10 so as to drive the lower sprocket 30 thereat and balance the operation and the forces being applied to the drive assemblies 26 and 28.

In order to support a plurality of rows of the shelf units 12, a plurality of parallel elongate support or carrying tubes 50 are uniformly spaced apart along the length of the endless belts 38 and 40 as illustrated in FIG. 1. The opposite ends 52 and 54 of each of the carrying tubes 50 are respectively connected to the belts 38 and 40. The tubes 50 are longitudinally oriented substantially parallel to the conveying path "A" and, in addition, project perpendicularly between the parallel vertical planes which define the movement loops of the belts 38 and 40. The rods 50 thus move in conjunction with the endless belts 38 and 40 upon rotation of the pulleys 30 and 32.

To receive and store the articles 18 in the carousel storage conveyor 10, a selected number of the shelf units 12 are suspended from each carrying tube 50. As illustrated in FIG. 3, four individual shelf units 12 are suspended from each rod 50, and each shelf unit 12 accommodates one of the articles 18. Each carrying rod 50 thus supports a row of the shelf units 12, and each row accommodates an aligned group of the articles 18 (commonly referred to as a "slug").

Referring to FIG. 2, clearance between the shelf units 12 is provided by locating the carrying tubes 50 a sufficient distance apart so as to allow the shelf units 12 to hang therebetween and support at least one article 18 therein. In addition, referring to FIG. 3, it will be appreciated that depending upon the size of the shelf units 12 and the articles 18 as well as the spacing between adjacent shelf units 12, the number of shelf units 12 which are provided on each carrying tube 50 may be varied. To permit unobstructed passage of the articles 18 along the conveyor 14, one row of shelf units 12 may be left empty or even eliminated.

Figures 10, 11:
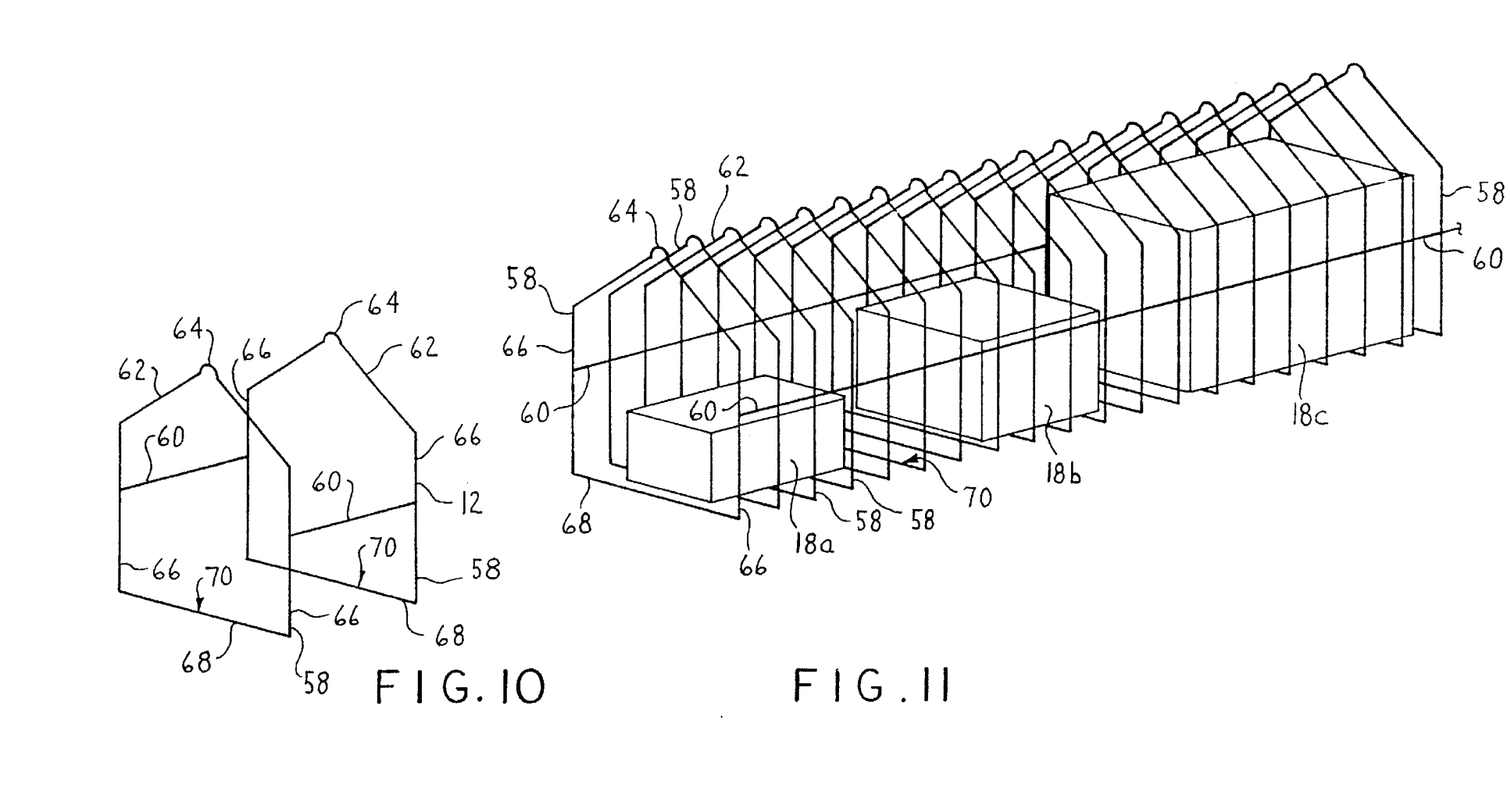
FIG. 10 is a perspective view of the one embodiment of the shelf unit as illustrated in FIG. 1.
FIG. 11 is a partial perspective view of the other embodiment of the shelf unit as illustrated in FIG. 7.

Referring to FIG. 10, one embodiment for the shelf unit 12 comprises a pair of hanger units 58 which are spaced apart in a longitudinal direction and are fixed relative to the other by transverse braces 60. Each hanger unit 58 is formed of a top member 62, which includes an arcuate section 64 for hanging of the hanger unit 58 from the corresponding carrying tube 50. Each hanger unit 58 also includes side members 66 which depend from said top member 62, and a bottom member 68 extending between the side members 66 to define an article support surface 70.

Figure 5:
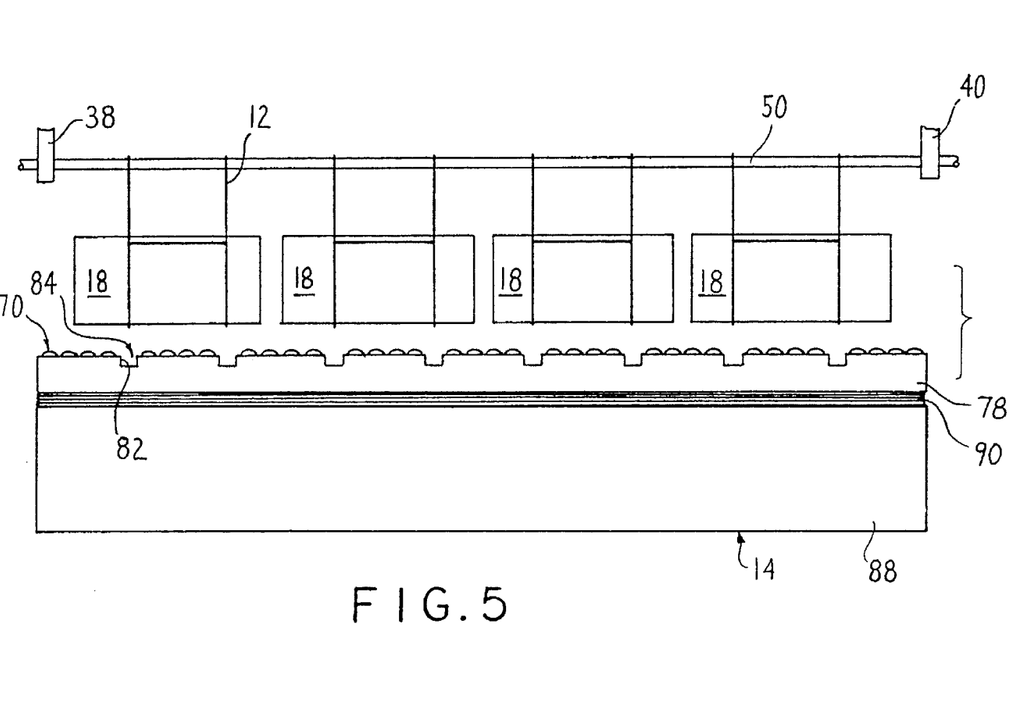
FIG. 5 is a partial front elevational view of the carousel storage conveyor illustrated in FIG. 4.

As can be seen in FIG. 5, the hanger units 58 should be spaced apart a sufficient distance so as to support the article 18 thereon. Referring to FIGS. 2 and 10, the hanger units 58 preferably define rectangular shaped open ends to receive various sized articles 18, although any suitable shape may be used so long as the article 18 spans the hanger units 58 and is supported on the article support surfaces 70.

As shown in FIGS. 2 and 3, the width of the hanger units 58 preferably should be chosen so that the shelf units 12 hang from the corresponding carrying tubes 50 without interfering with mutually adjacent shelf units 12.

Figure 7:
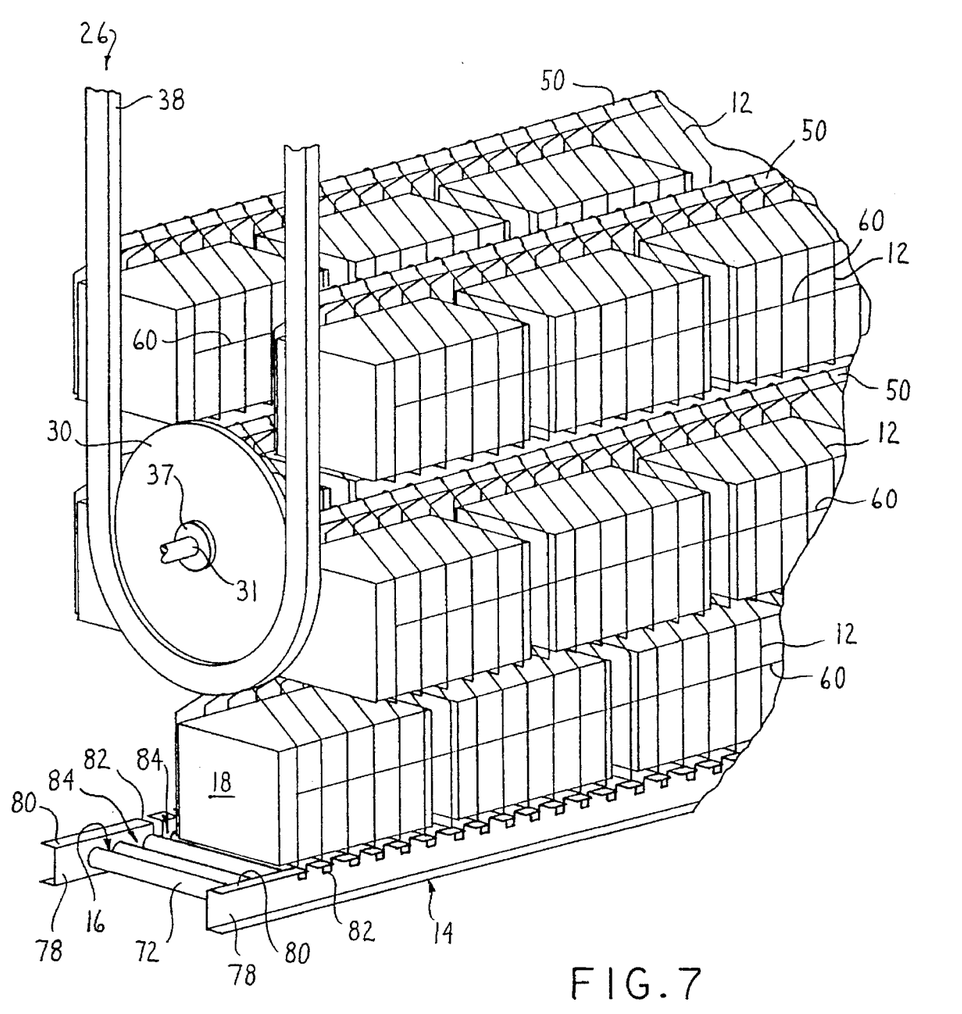
FIG. 7 is a partial perspective view of the carousel storage conveyor illustrating an alternative embodiment of the shelf units.

Referring to FIGS. 7 and 11, another embodiment for the shelf unit 12 is illustrated wherein the shelf unit 12 extends substantially between the drive assemblies 26 and 28 so that only one shelf unit 12 is supported on each carrying tube 50. In this embodiment, the shelf unit 12 is constructed of a greater number of hanger units 58 which are spaced apart at a smaller distance in comparison to the aforementioned embodiment and are fixed in such an arrangement by transverse braces 60.

This embodiment serves to accommodate a wider range of sizes of the articles 18 being supported and stored therein along the length of the shelf unit 12 wherein several representative articles are designated by reference numerals 18a–18c. It should be appreciated that the shelf unit 12 will readily accommodate smaller size articles 18 so long as the length thereof spans at least two mutually adjacent hanger units 58 and that larger size articles 18 may also be received therein, which size is limited by the open ends of the shelf unit 12.

In both of the embodiments illustrated in FIGS. 10 and 11, the hanger units 58 preferably are formed of elongate wire rod of any suitable diameter. A wire rod of about 3/16 inch diameter provides desired strength, rigidity and economy of weight for many use applications.

Referring to FIGS. 1 and 3, the conveyor unit 14 is a roller conveyor having a plurality of parallel rollers 72 arranged side by side along the length of the conveyor unit 14. The conveyor unit 14 receives the articles 18 from an upstream conveyor unit 74 and passes the articles 18 through to a downstream conveyor unit 76, which conveyor units 74 and 76 are illustrated in phantom outline in FIG. 1. The conveyor unit 74 and 76 may be provided solely for the transport of the articles 18 or may be components of other carousel storage conveyors (not illustrated).

The individual rollers 72 are rotatably mounted at their opposite ends to side rails 78 as illustrated in FIGS. 1–3. The conveyor surfaces 16 of the individual roller 72 may be disposed so that they extend above a top surface 80 of the side rails as illustrated in FIG. 3 or below the top surface 80 as illustrated in FIG. 7.

Figure 8:
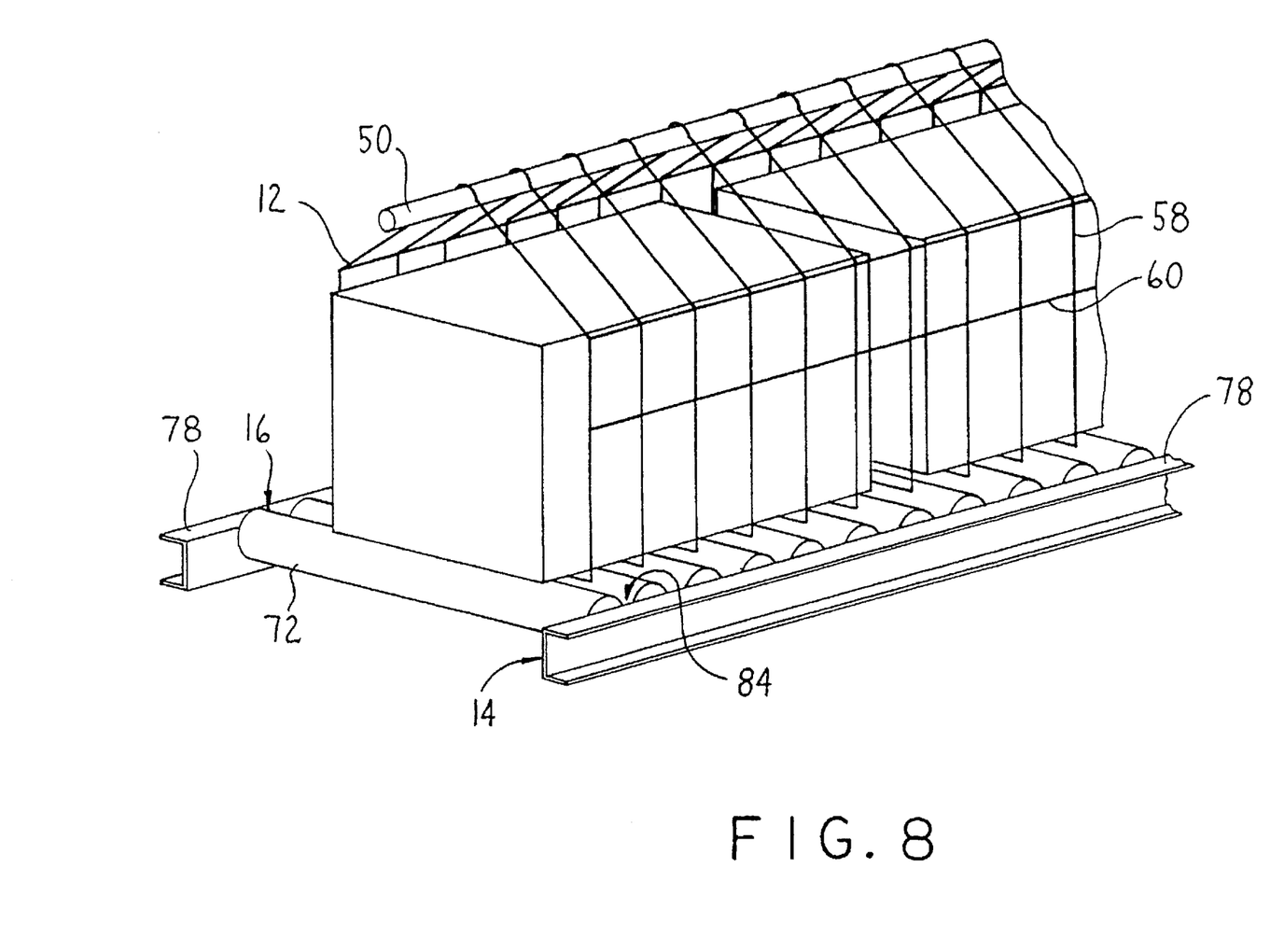
FIG. 8 is an enlarged, partial respective view of the shelf units illustrated in FIG. 7 illustrating an alternative embodiment of the conveyor unit.

To facilitate clearance of the side rails 78 by the hanger units 58 when they are positioned in the lowermost position illustrated in FIGS. 1 and 3, the side rails 78 may be provided with a plurality of notches 82 which correspond to the locations of the hanger units 58. In the other embodiment for the shelf units 12 illustrated in FIG. 7, the notches 82 are located closer together. As illustrated in FIG. 8, however, the side rails 78 need not be formed with notches so long as sufficient clearance is provided.

In addition, clearance spaces or recesses 84 are provided at predetermined locations along the conveyor surfaces 16, which clearance spaces 84 cooperate with the hanger units 58 as illustrated in FIG. 3. The clearance spaces 84 may be provided between each pair of rollers 72 as in the FIG. 7 variation or they may be provided between adjacent groupings of rollers 72 as in the FIG. 3 variation.

Figure 4:
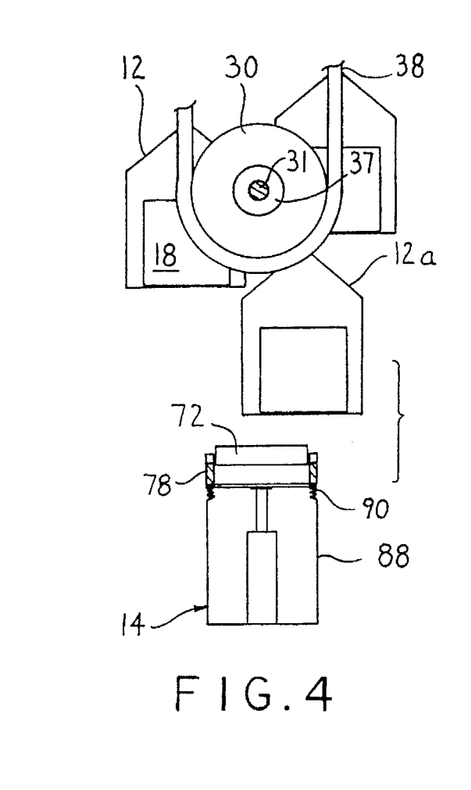
FIG. 4 is a partial side elevational view of the carousel storage conveyor of FIG. 1 with a conveyor unit illustrated in cross section.
Figure 9:
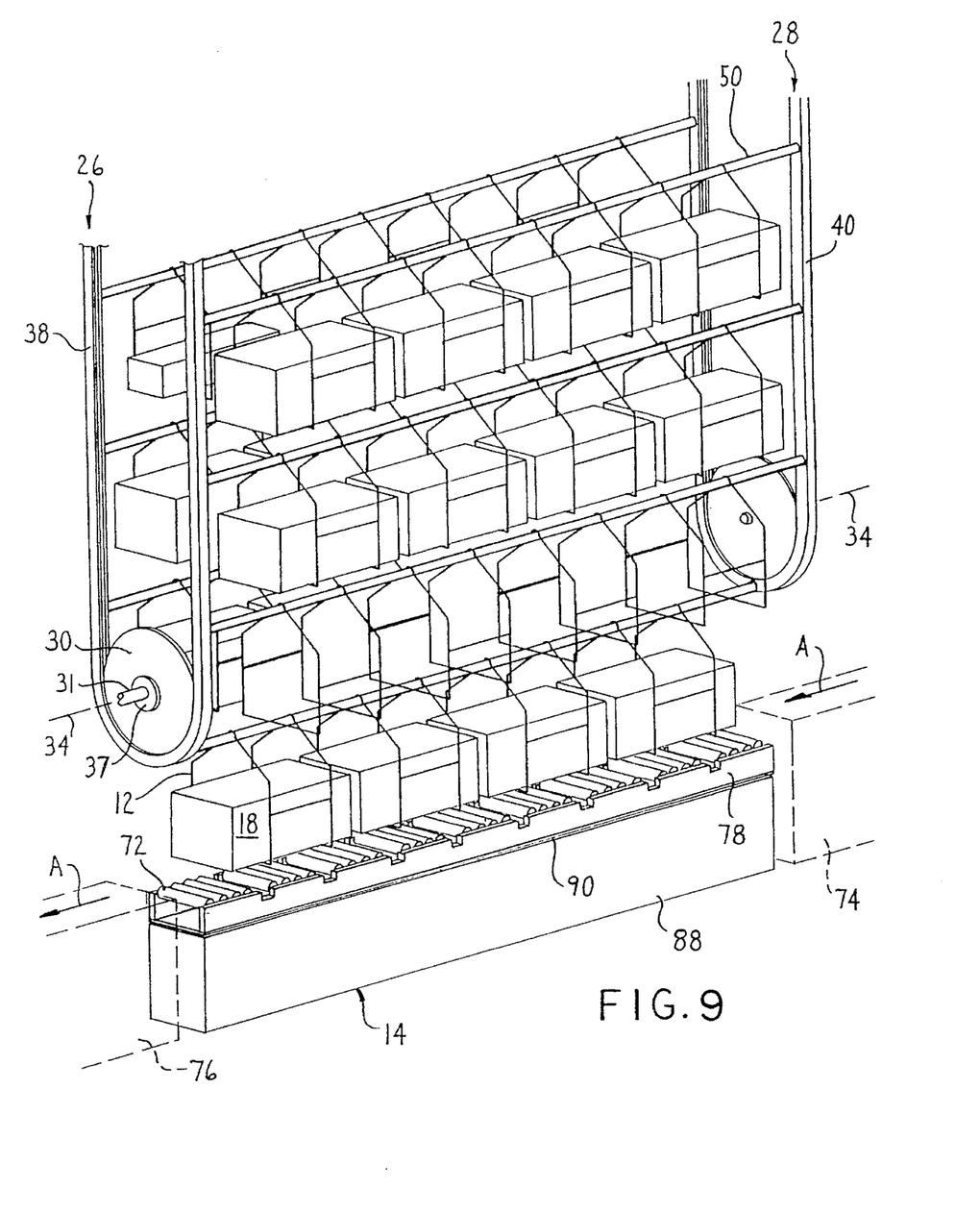
FIG. 9 is a partial perspective view of the carousel storage conveyor as shown in FIG. 1 which illustrates the conveyor unit in a lowered position.

To further facilitate clearance of the conveyor unit 14 by the shelf units 12 as they travel about the closed vertical loop path, the rollers 72 and side rails 78 of the conveyor unit 14 and in particular the conveyor surface 16 thereof are preferably vertically movable between a lowered illustrated in FIG. 5 and a raised position illustrated in FIG. 3. In the lowered position of FIG. 5, a vertical clearance gap is provided between the conveyor surface 16 and the bottom of the hanger units 58 so as to allow the shelf units 12 to travel through the closed loop path without interference with the conveyor 14. For example, FIG. 4 illustrates a shelf unit 12 which is either ascending when the sprocket 30 is rotating in a counterclockwise direction or descending when the sprocket is rotating in the clockwise direction. Thereafter, as illustrated in FIG. 9, when the conveyor unit 14 is in the lowered position and the shelf unit 12 is in its lowermost position, a clearance space remains therebetween. Preferably, the conveyor unit 14 is raised and lowered only one to two inches, although this gap is exaggerated in FIG. 9 for clarity.

Referring to FIGS. 1–3, when the conveyor unit 14 is in its upper position, the conveyor surfaces 16 of the roller 72 project above the article support surfaces 70 of the hangers 58 associated with the lowermost shelf unit 12. This defines a pass-through condition which permits the articles 18 to freely pass-through the shelf units 12 during normal operating conditions and also facilitates loading and unloading of the shelf units 12 when a delay has occurred downstream of the carousel storage conveyor 10. During the delay, slugs or groups of articles 18, in this case four (4), are transported through the shelf units 12 at a normal operating speed until the leading article 18a strikes a pop-up stop (not illustrated) which signals the carousel storage conveyor 10 to lower the conveyor unit 14 and effect rotation of the drive assemblies 26 and 28 so that the slug of articles 18 is picked up from the conveyor unit 14 and stored within the carousel storage conveyor 10.

To effect raising and lowering of the conveyor unit 14, lifting means 86 are provided within a housing 88 as illustrated in FIGS. 2 and 4. The lifting means 86 may be a hydraulic cylinder, scissor lift or other suitable lifting apparatus as the skilled artisan will appreciate. To seal the interior of the housing 88, a bellows 90 is provided between the housing 88 and the side rail 78.

While the articles 18 typically are transported in slugs, the slugs may be broken up by selectively actuating the rollers 72 at the downstream end 92 of the conveyor unit 14 at a faster speed relative to the remainder of the rollers 72. In this manner, singulated output is provided wherein the individual articles 18 are passed on to the downstream unit 76 separate from the remainder of the articles 18 in the slug. The higher rate rollers 72 may also be disposed at an upstream end 94 to provide singulated input and slug output.

To provide fully automated operation, a control system (not illustrated) is included which controls the components of the carousel storage conveyor 10 in accordance with the herein-described features of the invention. In particular, the control system serves to actuate the components in the desired sequence which sequence may vary depending, for example, upon the particular application for which the conveyor 10 is being used.

In operation, the slug of articles 18 typically is transported from the upstream unit 74 onto the conveyor unit 14 as illustrated in FIG. 1. At this time, the conveyor unit 14 is in the raised position so that the articles 18 may freely pass-through an empty row of the shelf units 12 until reaching a pop-up stop (not illustrated). At which time, if there is a delay downstream, the conveyor unit 14 may be displaced to the lowered position illustrated in FIG. 9 where the articles 18 are then supported by the article support surfaces 70 so as to be suspended from the corresponding carrying tube 50. For storage, the drive motor 42 rotates the lower sprocket so that the shelf unit 12 is raised as it travels along the closed loop path. Referring to FIG. 1, in such a manner, loading of the rows of shelf units 12 is repeated until the carousel storage conveyor 10 has reached its capacity or the downstream delay has ended. It may be desirable to leave one row of shelf units 12 empty, which row may be moved into its lowermost position proximate the conveyor unit 14 so as to permit pass-through of articles 18 without effecting any discharge of the articles 18 which are already stored within the carousel storage conveyor 10.

When retrieval of articles 18 is desired, the process is reversed. Where it is desirable to break up the slugs of articles 18, the rollers 72 at the downstream end 92 of the conveyor unit 14 may be operated at a higher speed to separate an individual article 18 from the remainder of the group.

To provide additional storage capacity or to facilitate selective routing of the different sizes or types of articles 18, two or more carousel storage conveyors 10 may be used which are arranged in parallel and/or series.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A carousel storage apparatus for the storage and retrieval of articles being conveyed comprising:

conveyor means for conveying said plurality of articles along a conveying path and having a conveyor surface for supporting said articles;

a support frame disposed proximate said conveying means;

first and second drive assemblies which are disposed above and spaced apart one from the other along said conveying path and which each have a drive member rotatably supported on said support frame that defines a first rotation axis, said first rotation axis extending substantially parallel to said conveying path;

at least one elongate carrying member extending between said first and second drive assemblies and having opposite ends connected respectively to said first and second drive assemblies at a predetermined distance from said first rotation axis so as to move in conjunction with said drive members;

at least one shelf unit having opposite open ends and including hanger units disposed in spaced relation along said carrying member, said hanger units including means for suspending said shelf unit from said carrying member so that said shelf unit moves through a closed loop path in conjunction with said carrying member, each said hanger unit defining opposite, spaced apart side surfaces and an article support surface extending therebetween, said opposite open ends of said shelf unit being oriented along said conveying path so as to accommodate at least one of said articles within said shelf unit; and drive means operatively engaged with at least one of said first and second drive assemblies for displacement of said shelf unit along said closed loop path toward and into said conveying path for passage of said articles into or out of said open ends of said shelf unit and for transverse displacement of said shelf unit out of said conveying path to a selected storage position along said closed loop path.

2. The apparatus as defined in claim 1, wherein each of said first and second drive assemblies comprises said first drive member, a second drive member rotatably mounted to said support frame and an endless member operatively engaged therebetween, said first drive member being disposed vertically above said conveying path so as to rotate about said first rotation axis, said second drive member being disposed a spaced apart distance away from said first drive member and said conveying path and defining a second rotation axis, said opposite ends of said carrying member being secured respectively to said endless members of said first and second drive assemblies so as to move about said first and second rotation axes.

3. The apparatus as defined in claim 2, wherein a plurality of said carrying members are connected to said endless members in spaced apart relation along the length thereof, and said carrying member having said at least one shelf unit suspended therefrom.

4. The apparatus as defined in claim 2, which further includes displacement means for displacing of said conveyor means relative to said first and second drive assemblies in a first direction toward the other to define a pass-through condition where said conveyor surface is above said article support surface and supports said articles received within said shelf unit and in a second direction away from the other to define a storage condition where said conveyor surface is below said article support surface such that said articles received within said shelf unit are supported by said article support surface.

5. The apparatus according to claim 4, wherein a row of said shelf units on one said carrying member is empty of articles to permit passage of articles therethrough when in said pass-through condition.

6. The apparatus according to claim 1, wherein each said hanger unit includes a top member which includes said means for suspending said shelf unit from said carrying member, two spaced apart side members which depend from said top member and define said side surfaces, and a bottom member extending between said side members and which defines said article support surface, said top, bottom and side members of two said hanger units defining said opposite open ends of said shelf unit.

7. The apparatus according to claim 6, wherein a plurality of said carrying members are provided in spaced apart relation and said shelf unit includes at least a mutually adjacent pair of said hanger units connected together by transverse members extending between said open ends, said conveyor means including upwardly oriented clearance spaces in said conveyor surface which cooperate with said hanger units corresponding thereto to facilitate passage of said articles along said conveying path through said hanger units and a pick up of said articles from said conveying surface.

8. The apparatus as defined in claim 7, wherein a plurality of said shelf units are suspended from each said carrying member to define a row thereof, each said shelf unit having at least two of said hanger units spaced apart a predetermined distance which is sufficient to accommodate at least one of said articles.

9. The apparatus as defined in claim 7, wherein one said shelf unit is suspended from each said carrying member to define a row thereof, each said shelf unit having a plurality of hanger units disposed along a length of said carrying member to accommodate a plurality of said articles.

10. A carousel storage apparatus for the storage and retrieval of articles being conveyed comprising:

conveyor means for conveying said plurality of articles along a conveying path and having a conveyor surface for supporting said articles;

a support frame disposed proximate said conveying means;

first and second drive assemblies which are disposed above and spaced apart one from the other along said conveying path and which each have a drive member rotatably supported on said support frame that defines at least a first rotation axis, said first rotation axis extending substantially parallel to said conveying path;

at least one elongate carrying member extending between said first and second drive assemblies and having opposite ends connected respectively to said first and second drive assemblies at a predetermined distance from said first rotation axis so as to move in conjunction with said drive members;

at least one shelf unit having means for suspending said shelf unit from said carrying member so that said shelf unit moves through a closed loop path in conjunction with said carrying member, each said shelf unit defining opposite, spaced apart side surfaces, an article support surface extending therebetween, and opposite open ends oriented along said conveying path so as to accommodate at least one of said articles within said shelf unit;

drive means operatively engaged with at least one of said first and second drive assemblies for displacement of said shelf unit along said closed loop path toward and into said conveying path for passage of said articles into or out of said open ends of said shelf unit and for displacement of said shelf unit transversely out of said conveying path to a selected storage position along said closed loop path; and displacement means for displacing said conveyor means relative to said drive assemblies in one direction toward the other to define a pass-through condition when said shelf unit is in said conveying path where said conveyor surface is above said article support surface and supports said articles received within said shelf units and in an opposite direction away from the other to define a storage condition where said conveyor surface is below said article support surface such that said articles received within said shelf units are supported by said article support surface.

11. The apparatus as claimed in claim 10, wherein each of said first and second drive assemblies comprises said first drive member, a second drive member rotatably mounted to said support frame and an endless member operatively engaged therebetween, said first drive member being disposed vertically above said conveying path so as to rotate about said first rotation axis, said second drive member being disposed a spaced apart distance away from said first drive member and said conveying path and defining a second rotation axis, said opposite ends of said carrying member being secured respectively to said endless members of said first and second drive assemblies so as to move about said first and second rotation axes.

12. The apparatus as defined in claim 11, wherein a plurality of said carrying members are connected to said endless members in a spaced apart relation along the length thereof, said carrying member having said at least one shelf unit suspended therefrom.

13. The apparatus according to claim 12, wherein a row of said shelf units is empty of articles to permit passage of articles therethrough when in said pass-through condition.

14. The apparatus according to claim 10, wherein said at least one shelf unit includes hanger units disposed in spaced relation along said carrying member which each include a top member having said means for suspending said shelf unit from said carrying member, two spaced apart side members which depend from said top member and define said side surfaces, and a bottom member extending between said side members which defines said article support surface, said top, bottom and side members of two said hanger units defining said opposite open ends of said shelf unit.

15. The apparatus according to claim 14, wherein a plurality of said carrying members are provided in spaced apart relation and said shelf unit includes at least a mutually adjacent pair of said hanger units connected together by transverse members extending between said open ends, said conveyor means including clearance spaces in said conveyor surface which cooperate with said hanger units corresponding thereto to facilitate a passage of said articles along said conveying path through said hanger units and a pick up of said articles from said conveying surface.

16. The apparatus as defined in claim 15, wherein a plurality of said shelf units are suspended from each said carrying member to define a row thereof, each said shelf unit having at least two of said hanger units spaced apart a predetermined distance which is sufficient to accommodate at least one of said articles.

17. The apparatus as defined in claim 15, wherein one said shelf unit is suspended from each said carrying member to define a row thereof, each said shelf unit having a plurality of hanger units disposed along a length of said carrying member to accommodate a plurality of said articles.

18. The apparatus as defined in claim 15, wherein said displacement means is a vertical lift means for selectively raising said conveyor surface to an upper position when in said pass-through condition and lowering said conveyor surface to a lowered position spaced apart from said shelf units when in said storage condition.

19. A storage arrangement comprising:

a generally horizontally elongated roller conveyor for support and transport of articles thereon, said roller conveyor including a plurality of rollers for supporting and conveying articles, said rollers being individually supported for rotation about substantially horizontal axes and being disposed in sidewardly spaced relation so that upper extremities of said plurality of rollers define a generally horizontally extending conveying plane where articles contact said rollers, said rollers defining a generally horizontal conveying direction which extends in a longitudinal direction of the roller conveyor;

said roller conveyor including at least an elongate roller conveyor section provided with a plurality of clearance spaces which open upwardly through the conveying plane and are horizontally elongated transverse to the conveying direction, said upwardly-opening access spaces being defined between adjacent said rollers at selected intervals through the roller conveyor section;

a carousel-type conveyor disposed generally over and projecting upwardly from said roller conveyor section for transfer of articles to or from said roller conveyor section;

said carousel-type conveyor including a supporting means which is positioned above said roller conveyor section and is moveable generally along a closed loop path which is disposed within a substantially vertical plane which transversely intersects said horizontal conveying direction, and a plurality of hanger units mounted on and vertically suspended from said supporting means at generally uniformly spaced intervals along said closed loop path;

each said hanger unit including a plurality of substantially closed looplike hangers which are generally aligned with one another in a direction parallel with said conveying direction and are generally spaced from one another in said direction so that each said looplike hanger is generally vertically aligned with one of said clearance spaces, each said looplike hanger having a generally flat bottom leg which extends generally horizontally and which at opposite ends joins to a pair of upwardly projecting side legs which in turn join to top legs which suspend the respective hanger from the support member;

said supporting means when moved through said loop causing the hanger unit to be moved into a lowermost position wherein the respective hanger unit is suspended directly over the roller conveyor section so that the bottom legs of the individual hangers are disposed within the respective clearance spaces at an elevation below said conveying plane, and opposite sides of each hanger being wholly opened so that the aligned hangers of the hanger unit define an open tunnel so that articles can be transferred between the hangers and the con veyor rollers when the hanger unit is in said lowermost position.

20. An arrangement according to claim 19, wherein each hanger is defined by a substantially closed wire loop, and wherein at least some adjacent said hangers are joined together by bracing elements which transversely extend between and are rigidly joined to adjacent said hangers.

* * * * *

UNITED STATES PATENT AND TRADEMARK OFFICE
CERTIFICATE OF CORRECTION

PATENT NO. : 5 529 165

DATED : June 25, 1996

INVENTOR(S) : Paul Thomas SHUPERT

It is certified that error appears in the above-indentified patent and that said Letters Patent is hereby corrected as shown below:

```
Column 7, line 23, before "drive" insert ---first---;
          line 30; delete "predetermined"; and
          line 32, before "drive" insert ---first---.
Column 8, line 5, delete "of";
          line 32, change "open ends" to ---mutually
          adjacent pair of hanger units---;
          line 58, before "drive" insert ---first---;
          line 65, delete "predetermined"; and
          line 67, before "drive" insert ---first---.
Column 10, line 49, change "hanger" to ---shelf---;
           line 53, change "hanger" to ---shelf---;
           line 66, change "hanger" to ---shelf---;
Column 11, line 1, change "hanger" to ---shelf---;
           line 7, change "hanger" to ---shelf---;
           line 8, change "con" to ---conveyor---.
```

UNITED STATES PATENT AND TRADEMARK OFFICE
CERTIFICATE OF CORRECTION

PATENT NO. : 5,529,165
DATED : June 25, 1996
INVENTOR(S) : Paul Thomas Shupert

It is certified that error appears in the above-indentified patent and that said Letters Patent is hereby corrected as shown below:

Column 12, line 1, delete "veyor": and change "hanger" to --shelf--.

Signed and Sealed this

Eleventh Day of March, 1997

Attest:

BRUCE LEHMAN

Attesting Officer

Commissioner of Patents and Trademarks